(12) United States Patent
Magder et al.

(10) Patent No.: US 9,396,585 B2
(45) Date of Patent: Jul. 19, 2016

(54) GENERATING INDIRECTION MAPS FOR TEXTURE SPACE EFFECTS

(71) Applicant: NVIDIA Corporation, Santa Clara, CA (US)

(72) Inventors: Lucas Magder, Santa Clara, CA (US); Michael Thompson, San Jose, CA (US); Zohirul Sharif, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 40 days.

(21) Appl. No.: 14/145,332

(22) Filed: Dec. 31, 2013

(65) Prior Publication Data

US 2015/0187135 A1    Jul. 2, 2015

(51) Int. Cl.
  *G06T 15/00*    (2011.01)
  *G06T 17/20*    (2006.01)
  *G06T 15/04*    (2011.01)

(52) U.S. Cl.
  CPC .......... *G06T 17/20* (2013.01); *G06T 15/04* (2013.01); *G06T 2210/56* (2013.01)

(58) Field of Classification Search
  CPC ...... G06T 17/20; G06T 2210/56; G06T 15/04
  USPC .................. 345/419, 420, 422, 423, 426, 507
  See application file for complete search history.

(56) References Cited

U.S. PATENT DOCUMENTS

| | | | | |
|---|---|---|---|---|
| 7,102,637 | B2 * | 9/2006 | Chen | 345/426 |
| 7,224,356 | B2 * | 5/2007 | Zhou et al. | 345/419 |
| 7,283,134 | B2 * | 10/2007 | Hoppe | 345/423 |
| 7,808,503 | B2 * | 10/2010 | Duluk et al. | 345/506 |
| RE42,406 | E * | 5/2011 | Kato | 345/423 |
| 8,665,266 | B2 * | 3/2014 | Vandrovec | 345/420 |
| 8,830,235 | B1 * | 9/2014 | Guskov et al. | 345/420 |
| 8,860,742 | B2 * | 10/2014 | Shebanow et al. | 345/557 |
| 2003/0218614 | A1 | 11/2003 | Lavelle et al. | |
| 2007/0002048 | A1 | 1/2007 | Takashima et al. | |

OTHER PUBLICATIONS

Gonzalez, Francisco, and Gustavo Patow. "Continuity mapping for multi-chart textures." ACM Transactions on Graphics (TOG). vol. 28. No. 5. ACM, 2009.
Mittring, Martin. "Advanced virtual texture topics." ACM SIGGRAPH 2008 Games. ACM, 2008.
Chappuis, Daniel. Photo-Realistic Real-time Face Rendering. No. EPFL-Student-164966. 2011.

* cited by examiner

*Primary Examiner* — Phu K Nguyen

(57) ABSTRACT

Embodiments of the present invention are directed to a novel approach for realistically modeling sub-surface scattering effects in three-dimensional objects of graphically rendered images. In an embodiment, an indirection map is generated for an image by analyzing the triangle mesh of one or more three-dimensional objects in the image and identifying pairs of edges between adjacent triangles in the mesh that have the same spatial locations in the three-dimensional representations, but which have different locations in the texture map. For each of these edges, the opposite triangle in each pair is projected into their corresponding edge's two-dimensional space. This allows samples which cross a seam in the two dimensional representation that would otherwise sample out into invalid data to be redirected to the spatially correct region of the texture and generate consistent results with non-seam areas.

20 Claims, 7 Drawing Sheets

GENERATING INDIRECTION MAPS FOR TEXTURE SPACE EFFECTS

BACKGROUND OF THE INVENTION

In the field of graphics rendering, objects in computer generated graphics are typically rendered to account only for the interaction of light at the surface of the object. For most opaque objects, this can be performed with little to no perceivable loss of realism. In contrast, rendering of objects that exhibit sub-surface scattering properties can be particularly complicated to perform realistically. These objects typically include those consisting of materials—such as skin, wax, ice, marble, jade, etc.—that naturally allow some light penetration at the surface of the material. Some of the penetrating light is absorbed, while the remaining portion subsequently scatters (diffuses) and brightens the immediately surrounding sub-surface area.

Realistically modeling these sub-surface scattering properties is difficult because of these particular effects. Often, the effect is approximated by mapping the surface of three-dimensional object (typically as a triangle mesh) into a flat two-dimensional representation, and rendering the lighting into a texture, stored as a texture map. The texture is then blurred or otherwise convolved to approximate the sub-surface scattering effect. However, it is often difficult or even impossible to create a flat representation of a three-dimensional model that will map completely as a single contiguous two dimensional region without artificial seams. Thus, what would appear in a three-dimensional model as contiguous or adjacent regions may be separated when the three-dimensional mesh is unwrapped into a two-dimensional representation. Blurring is a common technique used in rendering sub-surface scattering effects. When blurring or other sub-surface scattering effects are performed, the region that is sampled may spatially include portions that lie in non-contiguous region in the two-dimensional representation. This causes undesirable artifacts in the rendered two dimensional image such as unexpected and/or undesirable lines or incongruous lighting along the surface of objects.

Various approaches have been developed to address the issue. The simplest approach is to avoid the issue entirely by specifically authoring the art assets (objects) to hide the seams. This is particularly common when rendering clothing, for example, where additional layers or accessories can be superimposed over the lines, after the rendering process. However, super-imposing additional layers would require additional time and labor, even in some instances may not be possible, or desirable. Another approach is to use smaller sampling windows of the sub-scattering effect that make the defects less obvious. Unfortunately, while the effect may be mitigated by using smaller sampling windows, the problem cannot be completely eliminated by using smaller sampling windows, and the blurring effect is less realistically rendered when sampling windows become extremely small.

Yet another proposed solution is to apply the sub-surface scattering effects to an already rendered two dimensional image. However, while an object may be three-dimensional, two dimensional image are still rendered in two-dimensions for a given perspective. Thus, portions of the three-dimensional object (e.g., the back and portions of the side) of an object will not appear in an two dimensional image rendered from a perspective at the front of the object. This results in a lower quality of visual effect, as data corresponding to portions of the object that are not visible in the two dimensional image is lost, and cannot be used to contribute to application of the sub-surface scattering effect. Accordingly, the proposed conventional approaches to realistically rendering sub-surface scattering effects in a three-dimensional object are at best imperfect solutions, and each suffers from specific and significant flaws.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the present invention are directed to a novel approach for realistically modeling sub-surface scattering effects in three-dimensional objects of graphically rendered two dimensional image s. In an embodiment, an indirection map is generated for a two dimensional representation (UV mapping) of a three dimensional object (typically, a triangular mesh or collection of meshes sharing the same UV space). The indirection map may be generated by, for example, analyzing the triangle mesh of one or more three-dimensional objects in the two dimensional image and identifying pairs of edges between adjacent triangles in the mesh that have the same spatial locations in the three-dimensional representations, but which have different locations in the texture map. For each of these edges, the opposite triangle in each pair is projected into their corresponding edge's two-dimensional space.

This produces a two dimensional map, which for regions inside the original two-dimensional set will have a value that is the same as the coordinate of the value. Projected triangles are produced that occupy specifically placed empty regions in the two-dimensional space around each contiguous two-dimensional region. These projected triangles are sized to be at least as wide as the maximum sampling radius of the sub-surface scattering effect (e.g., a blur kernel). This allows samples which cross a seam in the two dimensional representation that would otherwise sample out into invalid data to be redirected to the spatially correct region of the texture and generate consistent results with non-seam areas.

According to another embodiment of the invention, a method is provided for utilizing an indirection map during the generation of a two dimensional image with three-dimensional objects exhibiting sub-surface scattering effects. The two dimensional image data containing the three-dimensional objects, and texture maps corresponding to the three dimensional objects is received, and sampling regions in the two dimensional image for sub-surface scattering effects are identified. An indirection map is referenced at coordinate locations corresponding to the sampling regions. The indirection map is mapped to locations of the texture maps corresponding to two-dimensional representations of the three-dimensional objects.

For coordinate locations that correspond to a region bounded by the contiguous two-dimensional representation, the indirection map is mapped to an unchanged position in the texture map. In contrast, when the coordinate location lies in a region outside the contiguous two-dimensional representation, but falls within pre-determined projected regions, the indirection map is mapped to an alternate, pre-determined position in the two-dimensional representation that falls within the contiguous pre-determined projected region. The indirection map can thus be utilized to determine the coordinates in a texture map that correspond to appropriate regions of a two-dimensional representation. By using the values at the determined positions, sampling and blurring effects can be applied with no loss in accuracy, and without producing undesirable artifacts.

BRIEF DESCRIPTION OF THE DRAWINGS

The accompanying drawings are incorporated in and form a part of this specification. The drawings illustrate embodiments. Together with the description, the drawings serve to explain the principles of the embodiments.

DETAILED DESCRIPTION

Figure 1:
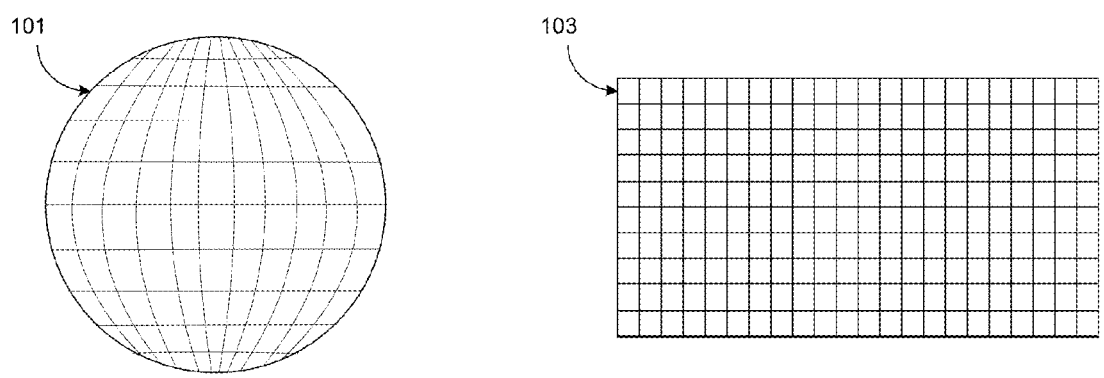
FIG. 1 depicts an exemplary projection of a three-dimensional object to a two-dimensional representation, in accordance with conventional hardware overlay allocation techniques.

Reference will now be made in detail to the preferred embodiments of the claimed subject matter, a method and system for the use of a radiographic system, examples of which are illustrated in the accompanying drawings. While the claimed subject matter will be described in conjunction with the preferred embodiments, it will be understood that they are not intended to limit these embodiments. On the contrary, the claimed subject matter is intended to cover alternatives, modifications and equivalents, which may be included within the spirit and scope as defined by the appended claims.

Furthermore, in the following detailed descriptions of embodiments of the claimed subject matter, numerous specific details are set forth in order to provide a thorough understanding of the claimed subject matter. However, it will be recognized by one of ordinary skill in the art that the claimed subject matter may be practiced without these specific details. In other instances, well known methods, procedures, components, and circuits have not been described in detail as not to obscure unnecessarily aspects of the claimed subject matter.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer generated step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present claimed subject matter, discussions utilizing terms such as "storing," "creating," "protecting," "receiving," "encrypting," "decrypting," "destroying," or the like, refer to the action and processes of a computer system or integrated circuit, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Conversion of 3D Objects to 2D Representations

FIG. 1 illustrates an exemplary projection of a three-dimensional object 101 to a two-dimensional representation 103. Also known as "UV Mapping," this process refers to the way each surface of a three-dimensional object is mapped to a two-dimensional texture. In one or more embodiments, the representation may be referred to as, alternately, a UV map, a UV space, UV set, UV layout, etc. The letters "U" and "V" are used conventionally to denote the axes of the 2D texture space rather than traditional "X", "Y" and "Z" named axes, which are often used to identify the axes of the three-dimensional object in model space. As depicted in FIG. 1, a three-dimensional object (sphere) 101 is modeled as a triangle mesh. The two-dimensional representation 103 is created by first "unwrapping" the three-dimensional triangle mesh into the UV map of the triangles. These triangles may be used by artists during asset creation to color the various surfaces represented by the triangles that make up a 3D object. In one or more embodiments, the colors (textures) from a two-dimensional UV texture map can be mapped to the unwrapped UV map.

When a model is created as a triangle mesh using a 3D modeler, coordinates in a two-dimensional UV space are generated for each vertex in the mesh. In one or more embodiments, a 3D modeler may unfold the triangle mesh at the seams, automatically laying out the triangles on a flat page. As depicted in FIG. 1, when the mesh is a sphere 101, the modeler may transform the three-dimensional sphere into an rectangular projection 103. Once the model is unwrapped, an artist is able to paint a texture on each triangle individually, using the unwrapped mesh as a template. The resulting two dimensional image is saved as a texture map. When the scene is actually rendered, each triangle of the three-dimensional model is mapped to the appropriate texture.

In one or more embodiments, the UV mapping process may be performed by assigning pixels in the two dimensional image to surface mappings on the triangle mesh. This can be accomplished by duplicating triangle of the two dimensional map onto the corresponding triangles in the three-dimensional object. During the actual rendering process, the rendering computation uses the UV texture coordinates to determine how the three dimensional surface is colored. In one or more embodiments, the UV map can be generated for a three-dimensional object either automatically by a software application, manually by an artist, or some combination of both. For example, a UV map may initially be generated automatically, and subsequently customized by an artist to minimize seams and overlaps.

Figure 2:
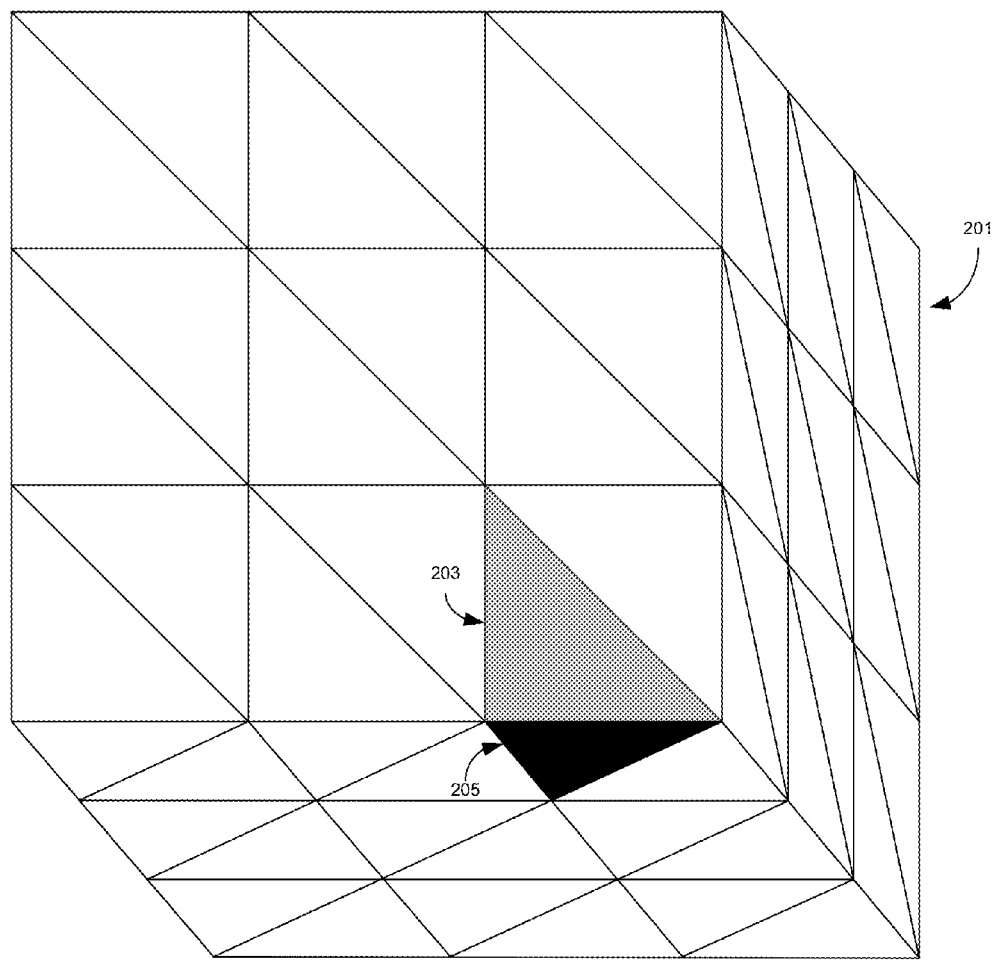
FIG. 2 depicts an exemplary triangle mesh of a three-dimensional object, in accordance with various embodiments of the present invention.
Figure 3:
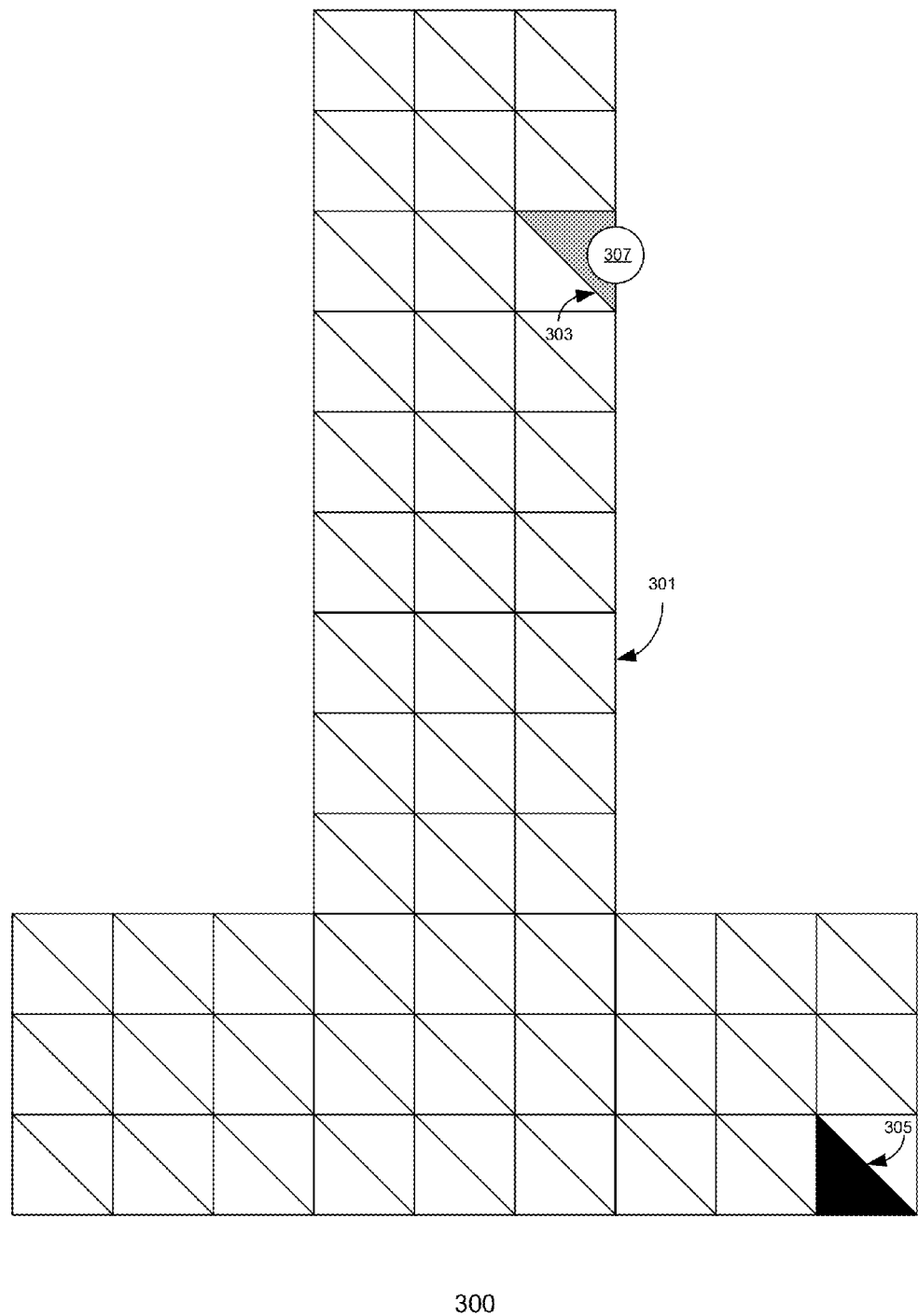
FIG. 3 depicts an exemplary two dimensional projection of a triangle mesh of a three-dimensional object, in accordance with various embodiments of the present invention.

Since UV coordinates are calculate per surface, not per vertex, a shared vertex will therefore have different UV coordinates for each triangle the vertex is shared between, and triangles that are adjacent in the three-dimensional model can be separated and positioned on different areas of the unwrapped two-dimensional representation, and the texture map. FIGS. 2 and 3 depict this behavior. FIG. 2 depicts an exemplary triangle mesh 201 of a three-dimensional object 200. As depicted in FIG. 2, the three-dimensional object 200 is implemented as a cube, and represented as a mesh of triangles. As shown in FIG. 2, triangles 203 and 205 of the triangle mesh are adjacent across an edge or "seam" in the object.

FIG. 3 depicts an exemplary two dimensional UV space 300 of a triangle mesh 301. In one or more embodiments, FIG. 3 depicts one possible "unwrapped" representation of the cube object 200 of FIG. 2. Unwrapping the object 200 into the mesh 301 is performed to allow an artist to paint a texture on each triangle individually. Triangle 303 corresponds to triangle 203 of FIG. 2, and triangle 305 corresponds to triangle 205 of FIG. 2. As depicted, while triangles 203 and 205 are adjacent in the triangle mesh 201 of the cube 200 in FIG. 2, corresponding triangles 303 and 305 are no longer adjacent in the unwrapped UV map 301. When blurring or other sub-surface scattering effects are performed on a three-dimensional object, one or more localized regions may be sampled. In these instances, the texture values may be referenced to perform the desired function (e.g., averaging the texture values corresponding to the localized region in a texture map). In some instances, the desired region may fall across a seam in a three-dimensional object. For example, sub-surface scattering effects may be desired in a region that includes portions of triangle 203 and 205 in the three-dimensional object 200 in FIG. 2. However, in the unwrapped UV map, corresponding triangles 303 and 305 are no longer adjacent. The portion of the targeted region (blur kernel) 307 that falls outside of triangle 303 would map to null data points, rather than the intended portion of triangle 305, which would compromise the blurring or other sub-surface scattering effect.

Figure 4:
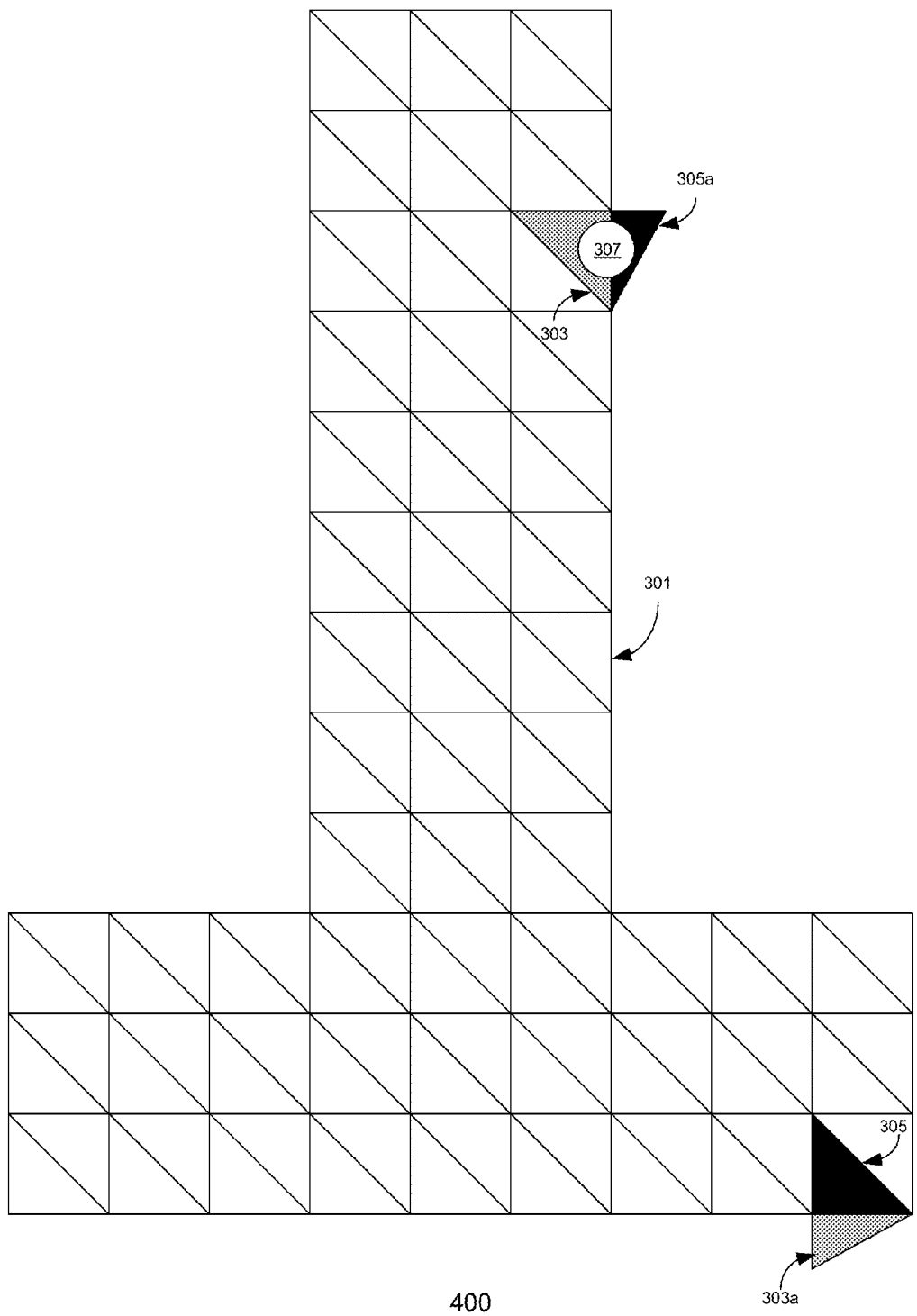
FIG. 4 depicts an exemplary two dimensional projection of a triangle mesh of a three-dimensional object including projected triangles with re-directed texture map addresses, in accordance with various embodiments of the present invention.

In one or more embodiments of the claimed subject matter, the portion of the target region 307 that falls outside of triangle 303 would be re-directed in a look-up or indirection map to reference the texture values corresponding to the desired position in triangle 305. This may be accomplished by forming projected triangles beyond the edge of the two-dimensional representation, and mapping the projected triangles to appropriate positions in the texture map. FIG. 4 depicts the exemplary two dimensional projection 300 of the triangle mesh 301 of the three-dimensional object 200, including projected triangles 303a, 305a with re-directed texture map addresses, in accordance with various embodiments of the present invention. Projected triangles may be generated by determining the two shared vertices of the triangles 203 and 205, projecting a third vertex into the unoccupied space of the UV map, and forming the projected triangle from the vertices. In one or more embodiments, the projected vertex may be clamped to a distance no larger than the diameter of the target region 307.

The area in the projected triangles are mapped to addresses in the texture map corresponding to the initial intended triangles. For example, area in projected triangle 305a is mapped to the same texture coordinates in the corresponding portion of triangle 305, with the area in projected triangle 303a being mapped to the texture values in the corresponding portion of triangle 303. According to embodiments of the present invention, this mapping may be maintained in a separate map—an indirection map—of addresses in the texture map. For positions in the UV map that fall within the bounded edges, the indirection map refers to the same address in the texture map corresponding to the position. For positions outside of the UV map but fall within projected triangles, however, the indirection map will be mapped instead to addresses in the texture map corresponding to the positions in adjacent triangles in the three-dimensional model.

Indirection Map Generation

Figure 5:
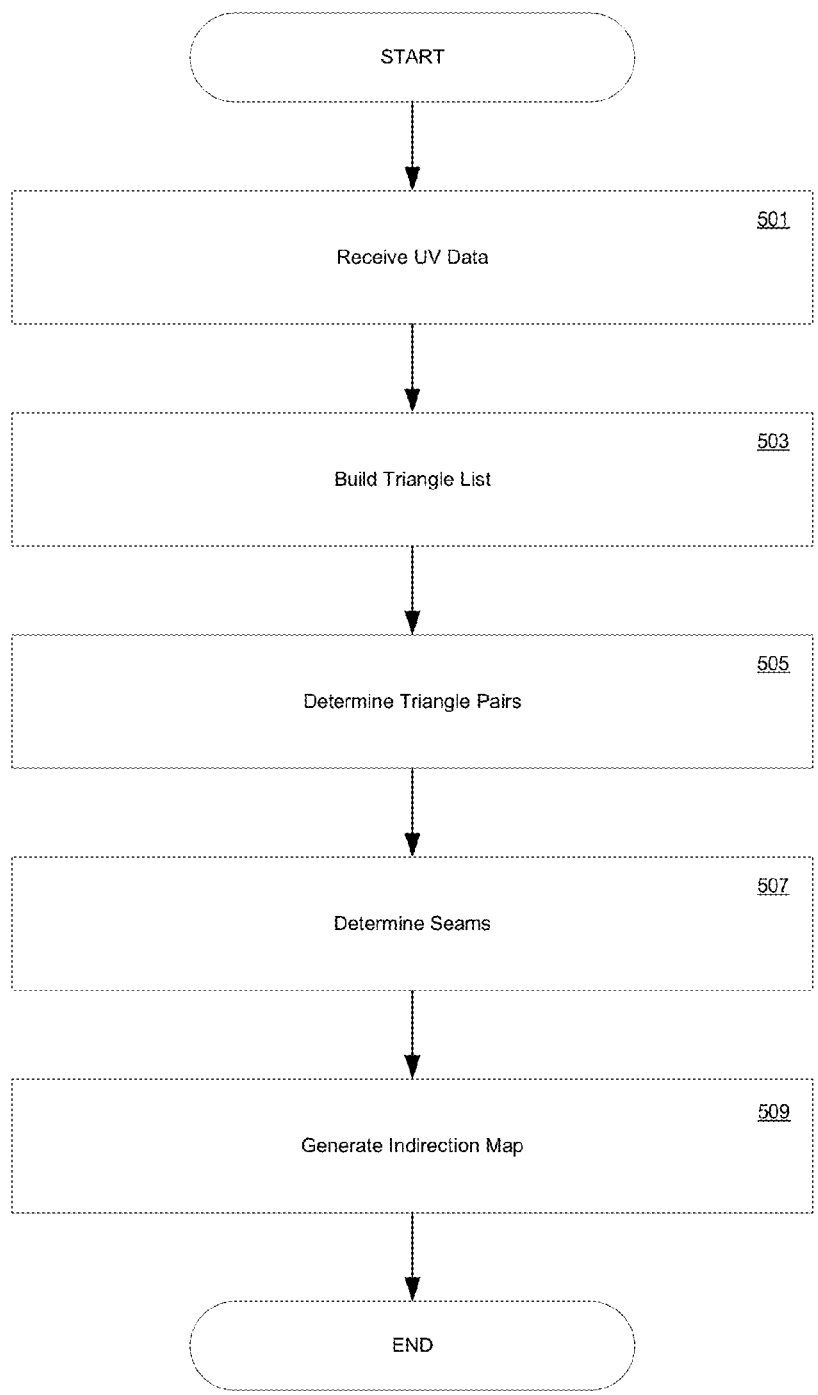
FIG. 5 depicts a flowchart of an exemplary process for generating an indirection map, in accordance with various embodiments of the present invention.

FIG. 5 depicts a flowchart of an exemplary process 500 for generating an indirection map, in accordance with various embodiments of the present invention. Steps 501-509 describe exemplary steps comprising the process 500 in accordance with the various embodiments herein described. According to various embodiments, steps 501-509 may be performed by a processor in a computing device.

At step 501, UV data is received from a triangle mesh. The UV data may comprise, for example, data corresponding to a three-dimensional model of an object, implemented as a triangle mesh. The UV data may also comprise the unwrapped, two-dimensional UV map of the three-dimensional model containing UV (texture) values of a texture map projected onto the UV map. At step 503, a triangle list is created from the UV map by building a list of the triangles in the UV map ordered according to their respective vertex coordinates. In one or more embodiments, creating the triangle list may be preceded by a pre-processing step wherein the channels or points outside of the mesh in the UV map is removed. For example: if there is a hard-edged normal that is not a UV seam. This may be performed by, for example, removing all the other channels then combing identical vertices. The triangle list may be subsequently filtered to remove triangles with duplicate addresses in the UV map. For example, a list of triangles in the mesh as created as triplets of vertex ids at step 503. In one or more embodiments, the triangle list may include, for each triangle, an array of indices of each of the vertices in the triangle.

At step 505, paired triangles from the triangle list are determined. Paired triangles may be determined by, for example, identify triangles with two shared vertices in the three-dimensional model (representing a shared edge). Determining a pair of triangles may be performed by storing, for each vertex point, a vertex list including the information of each triangle the vertex point is a vertex of, and the relative position of the triangle the vertex represents. For example a vertex 5 in triangle 3 at the first corner and triangle 7 at the second corner may be represented as: V[5]=((3,0),(7,1)). For each vertex in the vertex list, the other vertices in the vertex list that are at the same position within a small margin of error is then determined. The resulting list of vertices correspond to vertices in UV seams. For each matched pair of vertices, e.g., vertex A and vertex B, append the index coordinates of B to the indices of the triangle in the triangle list for each triangle referenced by vertex A in the vertex list, and vice versa. The resulting triangle list contains a list of vertices in each triangle as well as vertices that are co-located to the vertices in that triangle. These additional vertices are the vertices that are on the other side of the seam that the triangle is touching.

At step 507, the seams in the three-dimensional triangle mesh are determined. Step 507 may be performed by, for example, finding the edges for each triangle in the triangle list that contain points with multiple vertices attached to them.

The remaining edges may be stored in an edge list. If a triangle has no such points, that triangle may be discarded since it is not involved in a seam. Subsequently, for each edge in the edge list, the triangle list is searched for triangles which have an edge that involves the same set of vertices. These triangles represent the triangles on opposite sides of the seam. Each of the two triangles has one vertex which is not on the edge shared with the other triangle. These non-shared vertices are stored along with the triangle pair in a projected triangle list, which may be further filtered to remove duplicates. Once completed for each edge in the edge list, the projected triangle list contains a list of all unique combinations of the pair of triangles involved with seams as well as, for each triangle in the pair, the vertex in the other triangle that is not part of the given triangle (since of 6 overall corners it is known that there are only 4 unique points).

Finally at step 509, an indirection map is generated from the lists created in steps 503 to 507. The indirection map may be implemented by, for example, building a new two-dimensional mesh containing the original two-dimensional mesh as a starting point. This mesh uses the UV space of the original mesh instead of the original position data. For each pair of triangles (A,B) in the projected triangle list, there is a shared common edge in three-dimensional space. However this edge has two different positions in UV space (occupying two two-dimensional lines). A transformation matrix is computed from the position of the edge in the original two-dimensional UV space A to the position of the edge in the new two-dimensional mesh UV space B. This has two possible solutions because the second line could point in either direction relative to the first. However, when applied to transform the non-shared vertex from the first triangle of the paired triangles into UV space B, only one of these results in a position outside the original two-dimensional UV mesh. The other is discarded.

The determined transformed point forms a new projected triangle that shares an edge with triangles B in two-dimensional UV space but extends outside the boundary of the occupied UV space next to triangle B. This new point is clamped to a maximum distance in UV space from the common edge based on the UV space size of the expected target region (e.g., blur kernel). This is to prevent triangles which may have become very distorted by the transformation from overlapping too far and obscuring needed data. This new triangle is added to the new two-dimensional mesh M with its position set to its new position in UV space B but with its original texture values from UV space A. This process is repeated from UV space B to A yielding a second triangle which is also added to the new two-dimensional mesh. The order of triangles in the new two-dimensional mesh is reversed so that the original triangles of the mesh are at the end of the list, and therefore will render last, ensuring that none of projected triangles overlap onto of the interior of the valid UV area in the final interaction map since no indirection is required there.

Figure 6:
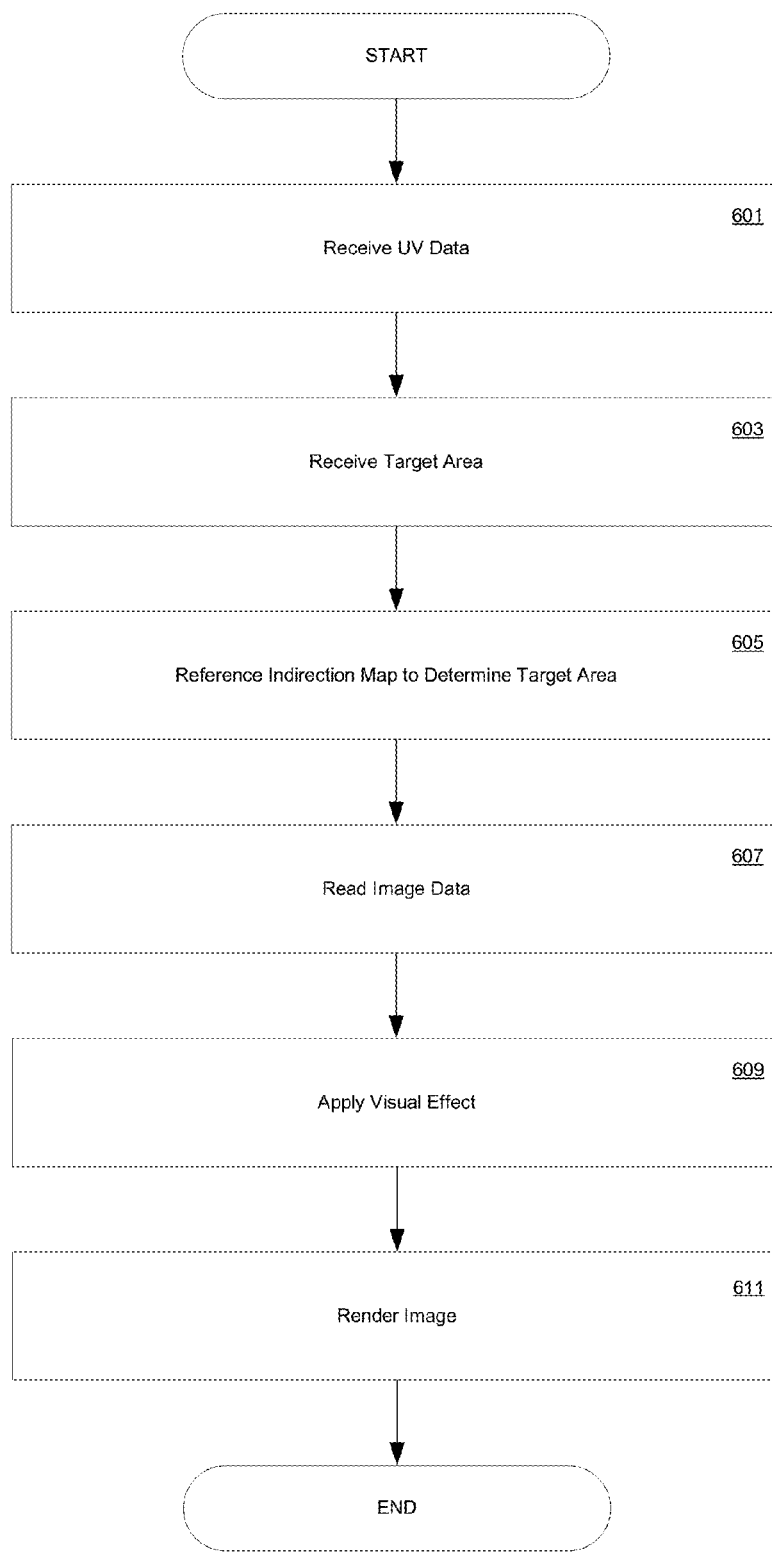
FIG. 6 depicts a flowchart of an exemplary process for utilizing an indirection map to render a two dimensional image with sub-surface scattering effects, in accordance with various embodiments of the present invention.

FIG. 6 depicts a flowchart of an exemplary process 600 for utilizing an indirection map to render a two dimensional image with sub-surface scattering effects, in accordance with various embodiments of the present invention. Steps 601-609 describe exemplary steps comprising the process 600 in accordance with the various embodiments herein described. According to various embodiments, steps 601-609 may be performed by a processor in a computing device.

At step 601, two dimensional image data is received. The two dimensional image data may comprise, for example, data corresponding to a three-dimensional model of an object, implemented as a triangle mesh; the unwrapped, two-dimensional UV map of the three-dimensional model containing UV (texture) values of a texture map projected onto the UV map; and an indirection map corresponding to the two-dimensional UV map. In one embodiment, the indirection map may be computed according to the process described above with respect to FIG. 5, and includes information to redirect look ups of data in the two-dimensional UV map that correspond to positions along seams in the three-dimensional model that are separated in the two-dimensional representation of the three-dimensional model.

At step 603, a target region in the two-dimensional UV map is determined. The target region may correspond, for example, to a desired region for sampling to perform sub-surface scattering effects. In one or more embodiments, the target region may be determined as one or more coordinate positions, or a coordinate position with an indicated shape and size. At step 605, the indirection map received in 601 is referenced to determine the addresses in the two-dimensional UV map to obtain the values of the target area. The indirection map indicates unchanged addresses for all positions within the two-dimensional representation of the object in the UV map. In one or more embodiments, the indirection map includes projected triangles that reside in positions that lie outside the area bounded by the two-dimensional representation and correspond to seams in the three-dimensional object; limited to a maximum distance corresponding to the expected (or pre-determined) size of the target region; and when referenced, redirect queries to appropriate positions in the UV map.

At step 607, image data corresponding to a scene to be rendered is read and the texture values obtained from the UV map as (re)directed by the indirection map are used at step 609 to perform and apply the sub-surface scattering effects to the image data. For example, a blur kernel may be applied, wherein the obtained values are averaged and the average value is stored for the target position. Steps 603-607 may be repeated for any number of received target areas. Once the visual effects are performed at 607, the resulting data is used to render the two dimensional image at step 609. In one or more embodiments, the two dimensional image may be rendered in a processor of a computing device. For example, a central processing unit (CPU) or graphics processing unit. In still further embodiments, the rendering of the graphical two dimensional image performed in FIG. 6 may be performed separately, and remotely, from the process of generating the indirection map performed in FIG. 5.

Exemplary Computing System

Figure 7:
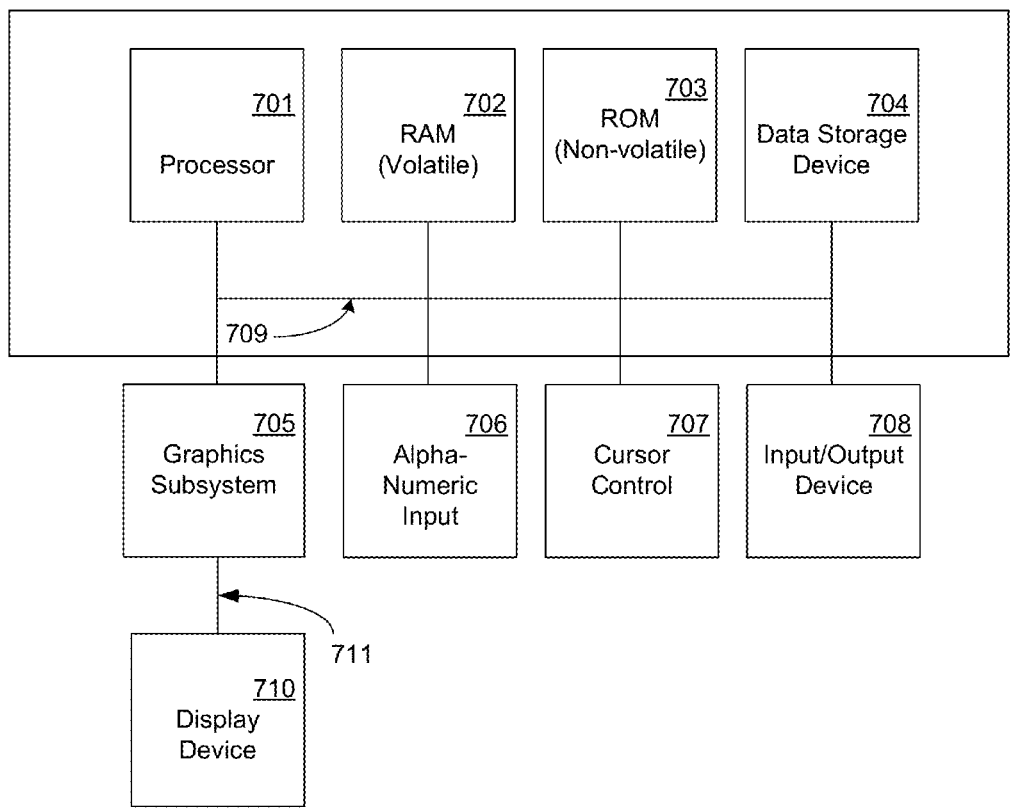
FIG. 7 depicts an exemplary computing system, upon which embodiments of the present invention may be implemented.

As presented in FIG. 7, a system for implementing embodiments includes a general purpose computing system environment, such as computing system 700. In its most basic configuration, computing system 700 typically includes at least one processing unit 701 and memory, and an address/data bus 709 (or other interface) for communicating information. Depending on the exact configuration and type of computing system environment, memory may be volatile (such as RAM 702), non-volatile (such as ROM 703, flash memory, etc.) or some combination of the two. Computer system 700 may also comprise one or more graphics subsystems 705 for presenting information to the computer user, e.g., by displaying information on attached display devices 710. In one or more embodiments, computing system 700, via the processing unit 701 and/or graphics subsystem 705 may be used to perform two dimensional image rendering according to the process described in FIG. 6.

Additionally, computing system 700 may also have additional features/functionality. For example, computing system 700 may also include additional storage (removable and/or non-removable) including, but not limited to, magnetic or optical disks or tape. Such additional storage is illustrated in FIG. 7 by data storage device 704. Computer storage media includes volatile and nonvolatile, removable and non-removable media implemented in any method or technology for storage of information such as computer readable instructions, data structures, program modules or other data. RAM 702, ROM 703, and data storage device 704 are all examples of computer storage media.

Computer system 700 also comprises an optional alphanumeric input device 707, an optional cursor control or directing device 707, and one or more signal communication interfaces (input/output devices, e.g., a network interface card) 707. Optional alphanumeric input device 707 can communicate information and command selections to central processor 701. Optional cursor control or directing device 707 is coupled to bus 709 for communicating user input information and command selections to central processor 701. Signal communication interface (input/output device) 707, which is also coupled to bus 709, can be a serial port. Communication interface 709 may also include wireless communication mechanisms. Using communication interface 709, computer system 700 can be communicatively coupled to other computer systems over a communication network such as the Internet or an intranet (e.g., a local area network), or can receive data (e.g., a digital television signal).

According to embodiments of the present invention, novel solutions and methods are provided for realistically modeling sub-surface scattering effects in three-dimensional objects of graphically rendered two dimensional images. In an embodiment, an indirection map is generated for a two dimensional image by analyzing the triangle mesh of one or more three-dimensional objects in the two dimensional image and identifying pairs of edges between adjacent triangles in the mesh that have the same spatial locations in the three-dimensional representations, but which have different locations in the texture map. For each of these edges, the opposite triangle in each pair is projected into their corresponding edge's two-dimensional space.

According to the embodiments described herein, various advantages are provided by such techniques. One specific advantage is to allow sampling of regions which cross a seam in the two dimensional representation that would otherwise sample out into invalid data to be redirected to the spatially correct region of the texture and generate consistent results with non-seam areas.

In the foregoing specification, embodiments have been described with reference to numerous specific details that may vary from implementation to implementation. Thus, the sole and exclusive indicator of what is the invention, and is intended by the applicant to be the invention, is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A method for generating an indirection map, the method comprising:
   receiving UV data, the UV data being comprised of: a triangle mesh comprising a plurality of triangles defined by a plurality of vertices in a two dimensional coordinate space; and a texture map comprising a plurality of color values at a plurality of positions in the two dimensional coordinate space;
   building a triangle list from the plurality of triangles, the triangle list mapping triangles of the plurality of triangles to a plurality of vertex coordinates corresponding to the plurality of vertices;
   determining a plurality of triangle pairs from the triangle list, each triangle pair comprising a pair of triangle pairs sharing an edge in a three-dimensional representation of the triangle mesh and which do not share an edge in a two-dimensional representation of the triangle mesh;
   determining a plurality of seams in the two dimensional coordinate space based on a plurality of edges between triangle pairs of the plurality of triangle pairs, each seam delineating a first region comprised in the triangle mesh from a second region not comprised in the triangle mesh; and
   automatically generating and storing an indirection map for the texture map based on the plurality of triangle pairs and the plurality of seams.

2. The method according to claim 1, wherein the determining the plurality of triangle pairs comprises:
   constructing a vertex list based on the plurality of vertices and the triangle list, the vertex list mapping vertices of the plurality of vertices to a plurality of corresponding triangles of the triangle list, and a corresponding position of the vertices in each corresponding triangle; and
   determining the plurality of triangle pairs based on the vertex list, each triangle pair comprising two triangles that share a pair of vertices forming an edge of each triangle in the triangle pair.

3. The method according to claim 2 wherein the constructing the vertex list comprises determining, for each vertex in the vertex list, a plurality of other vertices in the vertex list sharing a position with the vertex.

4. The method according to claim 3, wherein the building a triangle list comprises appending the triangle list wherein at least one triangle of the triangle list is mapped to a list of vertices defining the triangle and a set of vertices sharing a position with the vertices defining the triangle.

5. The method according to claim 3, wherein the automatically generating the indirection map comprises:
   for each triangle of each triangle pair,
   forming a first projected triangle in the second region sharing a first edge with a first triangle of the triangle pair in the two-dimensional representation, the first edge being comprised along a first seam of the plurality of seams;
   forming a second projected triangle in the second region sharing a second edge with a second triangle of the triangle pair in the two-dimensional representation, the second edge being comprised along a second seam of the plurality of seams;
   wherein a first plurality of points comprised in the first projected triangle is mapped in the indirection map to a plurality of corresponding points in the second triangle of the triangle pair,
   further wherein a second plurality of points comprised in the second projected triangle is mapped in the indirection map to a plurality of corresponding points in the first triangle of the triangle pair.

6. The method according to claim 5, wherein the first plurality of points is clamped within a pre-determined distance of the first seam, and wherein the second plurality of points is clamped within the pre-determined distance of the second seam.

7. The method according to claim 6, wherein the pre-determined distance corresponds to a width of a blur kernel.

8. The method according to claim 1, wherein the first region corresponds to a region in the two dimensional coordinate space that is visible in the triangle mesh in the three-dimensional representation of the triangle mesh, and the second region corresponds to a region in the two dimensional coordinate space that is not visible in the triangle mesh in the three-dimensional representation of the triangle mesh.

9. The method according to claim 1, wherein the building the triangle list comprises:
    sorting the triangle list based on the plurality of vertex coordinates; and
    filtering triangles from the triangle list to remove triangles corresponding to duplicate sets of vertex coordinates.

10. The method according to claim 1, further comprising:
    rendering a two dimensional image with the plurality of color values comprising the texture map based on the indirection map.

11. The method according to claim 10, wherein the rendering the two dimensional is performed in a graphics processing unit (GPU).

12. The method according to claim 11, wherein the rendering the two dimensional image comprises applying a plurality of visual effects to the plurality of color values.

13. The method according to claim 12, wherein the plurality of visual effects comprises at least one of:
    a blur kernel;
    a convolution; and
    a sub-surface scattering effect.

14. The method according to claim 11, further comprising:
    storing the two dimensional image as an two dimensional file.

15. A non-transitory computer readable medium containing program instructions embodied therein for generating an indirection map, the program instructions comprising:
    instructions to receive UV data, the UV data being comprised of: a triangle mesh comprising a plurality of triangles defined by a plurality of vertices in an two dimensional coordinate space; and a texture map comprising a plurality of color values at a plurality of positions in the two dimensional coordinate space;
    instructions to build a triangle list from the plurality of triangles, the triangle list mapping triangles of the plurality of triangles to a plurality of vertex coordinates corresponding to the plurality of vertices;
    instructions to determine a plurality of triangle pairs from the triangle list, each triangle pair comprising a pair of triangle pairs sharing an edge in a three-dimensional representation of the triangle mesh and which do not share an edge in a two-dimensional representation of the triangle mesh;
    instructions to determine a plurality of seams in the two dimensional coordinate space based on a plurality of edges between triangle pairs of the plurality of triangle pairs, each seam delineating a first region comprised in the triangle mesh from a second region not comprised in the triangle mesh; and
    instructions to automatically generate an indirection map for the texture map based on the plurality of triangle pairs and the plurality of seams.

16. The non-transitory computer readable medium according to claim 15, wherein the instructions to determine the plurality of triangle pairs comprises:
    instructions to construct a vertex list based on the plurality of vertices and the triangle list, the vertex list mapping vertices of the plurality of vertices to a plurality of corresponding triangles of the triangle list, and a corresponding position of the vertices in each corresponding triangle; and
    instructions to determine the plurality of triangle pairs based on the vertex list, each triangle pair comprising two triangles that share a pair of vertices forming an edge of each triangle in the triangle pair.

17. The non-transitory computer readable medium according to claim 16, wherein the instructions to construct the vertex list comprise instructions to determine, for each vertex in the vertex list, a plurality of other vertices in the vertex list sharing a position with the vertex.

18. The non-transitory computer readable medium according to claim 17, wherein the instructions to build a triangle list comprise instructions to append the triangle list wherein at least one triangle of the triangle list is mapped to a list of vertices defining the triangle and a set of vertices sharing a position with the vertices defining the triangle.

19. The non-transitory computer readable medium according to claim 18, wherein the instructions to automatically generate the indirection map comprise:
    for each triangle of each triangle pair,
    instructions to form a first projected triangle in the second region sharing a first edge with a first triangle of the triangle pair in the two-dimensional representation, the first edge being comprised along a first seam of the plurality of seams;
    instructions to form a second projected triangle in the second region sharing a second edge with a second triangle of the triangle pair in the two-dimensional representation, the second edge being comprised along a second seam of the plurality of seams;
    wherein a first plurality of points comprised in the first projected triangle is mapped in the indirection map to a plurality of corresponding points in the second triangle of the triangle pair,
    further wherein a second plurality of points comprised in the second projected triangle is mapped in the indirection map to a plurality of corresponding points in the first triangle of the triangle pair.

20. A system for generating an indirection map, the system comprising:
    a processor; and
    a memory comprising programmed instructions, which, when executed by the processor, is operable to cause the processor to:
    receive UV data, the UV data being comprised of: a triangle mesh comprising a plurality of triangles defined by a plurality of vertices in a two dimensional coordinate space; and a texture map comprising a plurality of color values at a plurality of positions in the two dimensional coordinate space;
    build a triangle list from the plurality of triangles, the triangle list mapping triangles of the plurality of triangles to a plurality of vertex coordinates corresponding to the plurality of vertices;
    determine a plurality of triangle pairs from the triangle list, each triangle pair comprising a pair of triangle pairs sharing an edge in a three-dimensional representation of the triangle mesh and which do not share an edge in a two-dimensional representation of the triangle mesh;
    determine a plurality of seams in the two dimensional coordinate space based on a plurality of edges between triangle pairs of the plurality of triangle pairs, each seam delineating a first region comprised in the triangle mesh from a second region not comprised in the triangle mesh; and automatically generate an indirection map for the texture map based on the plurality of triangle pairs and the plurality of seams.

* * * * *